April 22, 1958
G. PIEMONT
2,831,215
PROCESS FOR PRODUCING SHOULDER
STRIPS FOR BELT CONVEYORS
Filed June 18, 1954
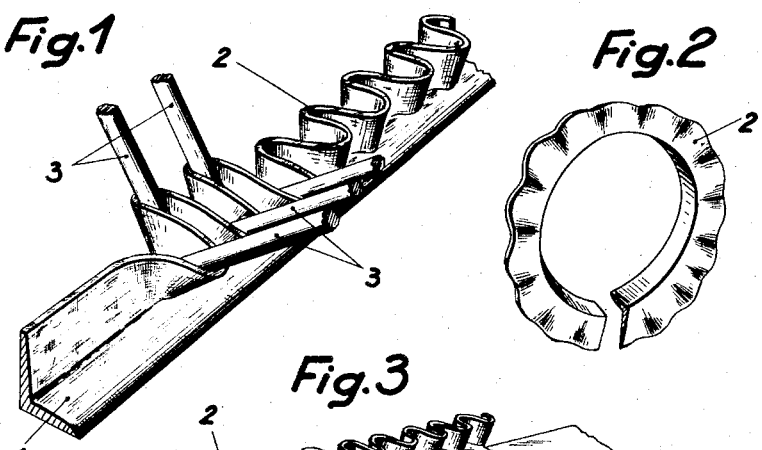
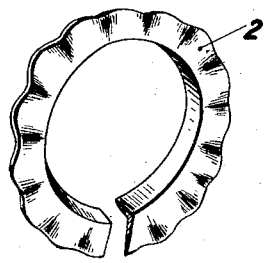
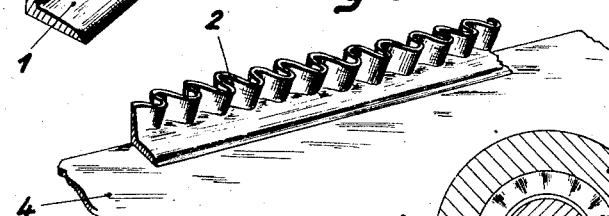
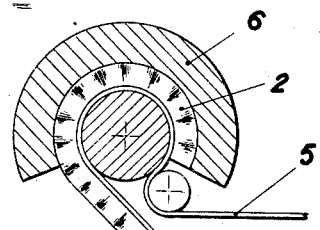
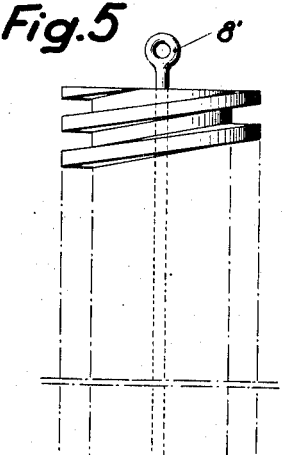
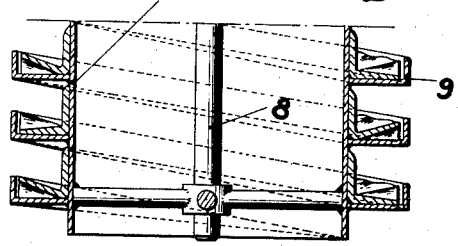
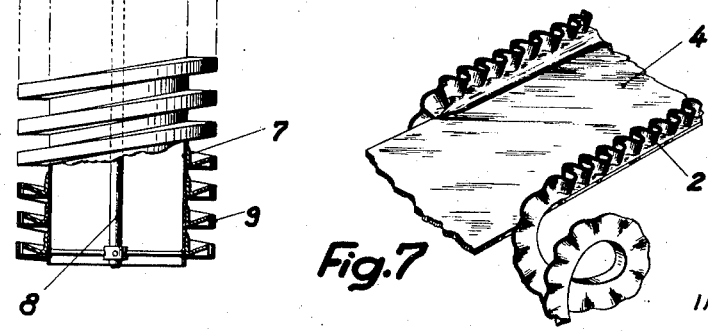
INVENTOR
GEORGES PIEMONT
By Linton and Linton
ATTORNEYS United States Patent Office 2,831,215
Patented Apr. 22, 1958

2,831,215

PROCESS FOR PRODUCING SHOULDER STRIPS FOR BELT CONVEYORS

Georges Piemont, Vanves, France

Application June 18, 1954, Serial No. 437,779

Claims priority, application France November 20, 1953

5 Claims. (Cl. 18—475)

The belt conveyors utilized in industries are, as a rule, flat. Certain belt conveyors are curved laterally in the shape of a longitudinal trough, by such means as e. g. lifting rolls for the purpose of increasing their capacity.

For this same purpose tests have been made with bands molded in a U-shape or having shoulder strips in the form of angles, the vertical wings of which are undulated in such a way as to compensate for the elongation of the upper part of said wings during the belt's passage over the feed rolls.

This method however has never been satisfactorily applied, because during the working operation the undulated vertical wings fissure, causing their breaking. In cases where the belt is molded together with its shoulders, the crack spreads over to the belt itself and caused the breaking of the entire conveyor.

The present invention which radically remedies these drawbacks, is mainly characterized by the fact that the aforesaid undulated shoulder strips have been vulcanized in a curve position analogous to the one they assume during their passage over the belt's feed rolls.

This manufacturing process will thus eliminate any strain on the undulated wing, which, to the contrary is compressed during the rectilinear travel of the belt.

The object of the present invention is to provide a process for forming of shoulder strips alone, of a predetermined length or in endless strips, which are fixed by sticking, vulcanization or riveting, on a belt and is also applicable to monoblock molding of the belt and its shoulder strips, whereby the vulcanization is performed as per successive curve sections.

According to one way of carrying out the invention, presenting the process in its most simple form, the manufacture of the shoulder strips can be carried out as follows:

(a) Extruding rubber to form a strip thereof having an angular cross-sectional configuration;

(b) Forming undulations of one of the wings of the strip by mechanical means, such as fingers, form-knurls, etc.;

(c) Circular bending, spiralled or helicoidal of the strip with the plain wing extending axially with the effect that the undulated wing will be curved edgeways and consequently will be under strain;

(d) Vulcanizing.

The invention will be better understood by means of the following description and the accompanying drawing, in which:

Fig. 1 shows the preparation of a shoulder strip before its vulcanizing;

Fig. 2 shows the form given to the shoulder strip during its vulcanizing;

Fig. 3 shows the vulcanized strip after being straightened;

Fig. 4 shows schematically the direct molding according to a modified process of the present invention, of successive sections of shoulder strips on a rolling belt conveyor;

Fig. 5 shows a helicoidal container for vulcanizing extended lengths of shoulder strips;

Fig. 6 is an enlarged cross-sectional view of a portion of the container shown in Fig. 5; and Fig. 7 shows shoulder strips during the mounting thereof on a belt conveyor.

Referring now more particularly to the accompanying drawing, the strip 1, made of non-vulcanized rubber, is shown in Fig. 1 after coming from an appropriate extruding machine and shaped as an angle, with plain wings.

Simultaneously or consecutively an undulation 2 of one of the wings is provided by means of fingers 3 for example.

Said strip, cut into fragments of given lengths is then circularly bent with the result that the undulations 2 will stand edgeways and will consequently be under strain (Fig. 2) and then the usual vulcanizing operation is performed with the strip held in this position by an appropriate hooping.

After vulcanization, the strip will keep its aforesaid curved shape with slight undulations with the result that if the strip is straightened for being fixed on conveying belt 4 by sticking, vulcanization, or riveting, the undulate part will be compressed and the undulations become accentuated (Fig. 3).

It is obvious that by this process where the normal shape of the undulations is that of one under pressure no fissure or breaking is possible during the passage over the feed rolls.

By the same process it is also possible to mold directly the strip 2 on the conveying belt 5 by means of an appropriate mold 6. Band 5 with strips 2 positioned thereon are passed around a roller 6″ within mold 6 when being baked and given a curved form while being joined together. Strips 2 and band 5 can then be straightened as in the manner of the previous example.

In a further modification of the invention as shown in Figs. 5 to 7 inclusive for producing strips of considerable length for industrial use a helicoidal container is used, constituted, e. g. of an iron sheet cylinder 7 supported by a rod 8 provided with a ring 8' for its handling.

On cylinder 7 a ramp 9 is helicoidally wound, and is shaped for receiving extruded and undulated strip 2 as described hereinabove. The winding of said strip is performed from one of the ramp extremities to the other one and said strip is wound around cylinder 7 upon its plain wing while its undulated wing being under strain because of the winding will rest on ramp 9 (Figs. 5 and 6).

The appliance will then be placed into an appropriate heating apparatus, strips 2 thereafter are removed, straightened and fixedly mounted on band 4.

It must be emphasized that the new manufacturing process, as described, covers as well the continuous or interrupted manufacturing of belt conveyors molded in only one piece with the undulated shoulder strips. In this case it is sufficient if the strips and belt conveyor portions are vulcanized while arranged in the aforementioned curve shape, with the effect that the undulations will be under strain during the vulcanizing operation.

Having thus described my invention what I claim is:

1. A process for producing undulated rubber shoulder strips for belt conveyors consisting in forming strips of rubber having a pair of wings extending at an angle to one another, imparting undulations to one of said wings, bending said strips into a curved shape with the undulations of said undulated wing being lengthened thereby and vulcanizing said strips while maintained in said curved shape.

2. A process for producing undulated rubber shoulder strips for belt conveyors consisting in forming strips of rubber having a pair of wings extending at an angle to one another, imparting undulations to one of said wings, curving successive sections of said strips lengthening the undulations of each section so curved, and vulcanizing the sections of said strips at the same time they are being curved.

3. A process for producing undulated rubber shoulder strips on belt conveyors, consisting in forming strips of rubber having a pair of wings extending at an angle to one another, imparting undulations to one of said wings, positioning the other wing of said strips upon a conveyor belt, passing said belt and strips thereon through a curve lengthening the undulations of the undulated wing, vulcanizing said strips to said belt at the same time both are passing through said curve.

4. A process for producing undulated rubber shoulder strips for belt conveyors consisting in forming strips of rubber with a pair of wings extending at an angle to one another, forming undulations in one of said wings, winding said strips into a helicoid with the undulations of said undulated wing being lengthened thereby, and heating said strips while maintained as said helicoid.

5. A process for producing a rubber belt conveyor having side shoulders, consisting in molding a belt conveyor with longitudinally extending side shoulders extending at an angle thereto, forming undulations in said shoulders, bending successive portions of said belt to lengthen the undulations of said shoulders, and heating said shoulders while the undulations are so lengthened.

References Cited in the file of this patent

UNITED STATES PATENTS

| | | |
|---|---|---|
| 711,840 | Fernald | Oct. 21, 1902 |
| 1,912,807 | Venosta | June 6, 1933 |
| 2,259,161 | Hansen | Oct. 14, 1941 |
| 2,555,409 | Hosfield | June 5, 1951 |
| 2,622,358 | Reeves | Dec. 23, 1952 |